United States Patent [19]
Loewenstein et al.

[11] Patent Number: 5,893,160
[45] Date of Patent: Apr. 6, 1999

[54] DETERMINISTIC DISTRIBUTED MULTI-CACHE COHERENCE METHOD AND SYSTEM

[75] Inventors: Paul N. Loewenstein; Erik Hagersten, both of Palo Alto, Calif.

[73] Assignee: Sun Microsystems, Inc., Mountain View, Calif.

[21] Appl. No.: 630,703

[22] Filed: Apr. 8, 1996

[51] Int. Cl.$^6$ .................................................. G06F 12/00
[52] U.S. Cl. .......................... 711/152; 711/124; 711/150; 711/163; 711/151
[58] Field of Search ................................ 395/457, 674, 395/250, 497.01, 448, 472, 473, 494; 711/130, 170, 121, 145, 146, 167

[56] References Cited

U.S. PATENT DOCUMENTS

| | | |
|---|---|---|
| 4,805,106 | 2/1989 | Pfeifer . |
| 4,916,604 | 4/1990 | Yamamoto et al. .................... 395/457 |
| 4,975,833 | 12/1990 | Jinzaki . |
| 5,161,227 | 11/1992 | Dias et al. ............................ 395/674 |
| 5,224,214 | 6/1993 | Rosich ................................. 395/250 |
| 5,237,673 | 8/1993 | Orbits et al. ....................... 395/497.01 |
| 5,297,269 | 3/1994 | Donaldson et al. . |
| 5,301,337 | 4/1994 | Wells, et al. . |
| 5,303,362 | 4/1994 | Butts, Jr. et al. ...................... 395/448 |
| 5,499,356 | 3/1996 | Eckert, et al. . |
| 5,551,005 | 8/1996 | Sarangdhar et al. .................. 395/472 |
| 5,572,702 | 11/1996 | Sarangdhar et al. .................. 395/473 |
| 5,642,494 | 6/1997 | Wang et al. .......................... 395/494 |
| 5,740,401 | 4/1998 | Hanawa, et al. . |

OTHER PUBLICATIONS

Stenstroöm et al., "An Adaptive Cache Coherence Protocol Optimized for Migratory Sharing," Proc. 20$^{th}$ Annual Symposium on Computer Architecture, May 1993 IEEE, pp. 109–118.

Cox et al., "Adaptive Cache Coherency for Detecting Migratory Shared Data," Proc. 20$^{th}$ Annual Symposium on Computer Architecture, May 1993, pp. 98–108.

Wolf–Dietrich Weber et al., "Analysis of Cache Invalidation Patterns in Multiprocessors", Computer Systems Laboratory, Stanford University, CA. pp. 243–256.

Kourosh et al., "Two Techniques to Enhance the Performance of Memory Consistency Models," 1991 International Conference on Parallel Processing, pp. 1–10.

Li et al., "Memory Coherence in Shared Virtual Memory Systems," 1986 ACM, pp. 229–239.

D. Lenosky, PhD, "The Description and Analysis of DASH: A Scalable Directory–Based Multiprocessor," *DASH Prototype System*, Dec. 1991, pp. 36–56.

Hagersten et al., "Simple COMA Node Implementations," Ashley Saulsbury and Anders Landin Swedish Institute of Computer Science, 12 pp.

Saulsbury et al., "An Argument for Simple COMA," Swedish Institute of Computer Science, 10 pp.

(List continued on next page.)

*Primary Examiner*—Tod R. Swann
*Assistant Examiner*—Fred F. Tzeng
*Attorney, Agent, or Firm*—Conley, Rose & Tayon, PC; B. Noel Kivlin

[57] ABSTRACT

An efficient streamlined coherent protocol for a multi-processor multi-cache computing system. Each subsystem includes at least one processor and an associated cache and directory. The subsystems are coupled to a global interconnect via global interfaces. In one embodiment, each global interface includes a request agent (RA), a directory agent (DA) and a slave agent (SA). The RA provides a subsystem with a mechanism for sending read and write request to the DA of another subsystem. The DA is responsible for accessing and updating its home directory. The SA is responsible for responding to requests from the DA of another subsystem. Each subsystem also includes a blocker coupled to a DA and associated with a home directory. All requests for a cache line are screened by the blocker associated with each home directory. Blockers are responsible for blocking new request(s) for a cache line until an outstanding request for that cache line has been serviced. A "locked" state managed by the blocker greatly reduces corner cases and simplifies solutions in the few remaining corner cases.

30 Claims, 16 Drawing Sheets

OTHER PUBLICATIONS

Hagersten et al., "Simple COMA," Ashley Saulsbury and Anders Landin Swedish Institute of Computer Science, Jul. 1993, pp. 233–259.

Chaiken, D. et al., "Limitless Directories: A Scalable Cache Coherence Scheme," Computer Architecture News, vol. 19, No. 2, Apr. 1, 1991, pp. 224–234.

Scheurich, C. et al., "The Design of a Lock–Up Free Cache for High–Performance Multiprocessors," Proceedings of the Supercomputing Conference, Orlando, Nov. 14–18, 1988, Institute of Electrical and Electronics Engineers, pp. 352–359.

European Search Report for European Patent Application No. 97302037.3 dated Aug. 13, 1997.

DETERMINISTIC DISTRIBUTED MULTI-CACHE COHERENCE METHOD AND SYSTEM

BACKGROUND OF THE INVENTION

1. Field of the Invention

This invention relates to caches. In particular, this invention relates to a cache coherency scheme for multiple caches in a multiprocessor system.

2. Description of the Related Art

With the shift of computing technology to the "network is the computer" paradigm, the need for a shared global memory address space and a coherent caching system in a networked computing system becomes increasingly important. FIG. 1A is a block diagram showing one such networked computer system 100 with a conventional non-uniform memory architecture (NUMA). System 100 includes a plurality of subsystems 110, 120, ... 180, coupled to each other via a global interconnect 190. Each subsystem is assigned a unique network node address. Each subsystem includes one or more processors, a corresponding number of memory management units (MMUs) and caches, a main memory assigned with a portion of a global memory address space, a global interface and a local subsystem interconnect. For example, subsystem 110 includes processors 111$a$, 111$b$ ... 111$i$, MMUs 112$a$, 112$b$, ... 112$i$, caches 113$a$, 113$b$, ... 113$i$, main memory 114, global interface 115 and subsystem interconnect 119.

Data from main memories 114, 124, ... 184 may be stored in one or more of caches 113$a$ ... 113$i$, 123$a$ ... 123$i$, and 183$a$ ... 183$i$. Thus, cache coherency among caches 113$a$ ... 113$i$, 123$a$ ... 123$i$, and 183$a$ ... 183$i$ is maintained in order for system 100 to execute shared-memory programs correctly.

In order to support a conventional directory-based cache coherency scheme, subsystems 110, 120, ... 180 also include directories 116, 126, ... 186 coupled to global interfaces 115, 125, ... 185, respectively. Referring now to FIG. 1B, each global interface, e.g., interface 115 includes a slave agent ("SA"), a request agent ("RA") and a directory agent ("DA"), e.g, SA 115$a$, RA 115$b$ and DA 115$c$. Each DA is responsible for updating its associated directory with the status of all cached copies of its (home) main memory, including copies cached in other subsystems.

The status of cached copies in each node are recorded in directories 116, 126, ... 186 as one of four states per node. An invalid ("I") state indicates that the node, i.e., subsystem, does not have a copy of the data line of interest. A shared ("S") state indicates that the node has an S copy, and that possibly other nodes may have S copies. An owned ("O") state indicates that the node has an O copy, and that possibly other nodes may have S copies. Note that the node with the O copy is required to perform a write-back upon replacement. Finally, a modified ("M") state indicates that the node is the sole owner of the data line, i.e., there are no S copies in the other nodes.

A RA provides a subsystem with a mechanism for sending read and write requests to the other subsystems. A DA provides access to and is responsible for updating its associated home directory. An SA is responsible for responding to requests from the DA of another subsystem.

Requests for data and responses are exchanged by the respective agents between subsystems 110, 120, ... 180 in the form of data/control packets, thereby enabling subsystems to keep track of the states of their caches 113$a$ ... 113$i$, 123$a$ ... 123$i$, and 183$a$ ... 183$i$ in directories 116, 126, ... 186, respectively. These data/control packets are transported between subsystems via global interconnect 190. Unfortunately, since global interconnect 190 may be based on any one of a number of conventional networking protocols, e.g., a collision sense multiple access (CSMA) protocol, from the timing viewpoint, subsystems 110, 120, . . . 180 may be loosely coupled to each other at the network layer of the protocol. As such, while the arrival of packets end-to-end is guaranteed, the order of arrival of the packets is not necessarily guaranteed. The out-of-order arrival of packets at subsystems 110, 120, ... 180 is problematic because they can result in "corner cases" which, if not detected and resolved, can disrupt cache coherency.

One such corner case is illustrated by FIGS. 2A–2D in which a data packet associated with an earlier-in-time read-to-share request (RTS_req) arrives after the cache line is prematurely invalidated as a result of the arrival of a later-in-time read-to-own request (RTO_req) initiated by another subsystem. In this example, initially, subsystem 110, subsystem 120 and a fourth subsystem (not shown in FIG. 1A) have shared ("S") copies of a data line from the memory space of subsystem 180.

Referring first to FIG. 2A, RA1 of global interface 115 of subsystem 110 sends a RTS_req packet to DA8 of global interface 185 of subsystem 180. As shown in FIG. 2B, DA8 responds by initiating the transfer of a data packet to the requesting RA1.

Next, as shown in FIG. 2C, before the data packet arrives at RA1, RA2 of global interface 125 of subsystem 120 sends a read-to-own request (RTO_req) packet to DA8.

FIG. 2D shows DA8 respond by initiating the transfer of a data packet to RA2. In addition, DA8 sends invalidate (Invld) packets to SA1 and SA4, the slave agents of subsystem 110 and the fourth subsystem, respectively.

Unfortunately, the later-in-time Invld packet arrives at SA1 before the earlier-in-time data packet arrives at RA1. As a result, SA1 receives the Invld packet first and proceeds to invalidate the old S copy of the data line of interest. Subsequently, RA1 receives the data packet, but is unable to update the value of its S copy because it has been erroneously and prematurely marked Invld.

Several conventional brute-force handshaking protocols for resolving corner cases do exist. FIGS. 3A–3F illustrate one prior art solution to the corner case described above. Again, using the same starting conditions as the example illustrated by FIGS. 2A–2D, subsystem 110, subsystem 120 and the fourth subsystem have S copies of a data line from the memory space of subsystem 180.

Referring first to FIG. 3A, RA1 of subsystem 110 sends a RTS_req packet to DA8 of subsystem 180.

As shown in FIG. 3B, DA8 responds by initiating the transfer of a data packet to the requesting RA1. DA8 then idles while waiting for a read-acknowledgment (RTS_ack) packet from RA1.

Next, as shown in FIG. 3C, RA2 sends a RTO_req packet to DA8. However, DA8 is idle because it is waiting for a RTS_ack packet from RA1 to arrive, and hence is unresponsive.

As shown in FIG. 3D, after receiving the RTS_ack packet from RA1, DA8 is no longer idle and is now able to respond to the RTO_req packet from RA2.

Accordingly, as shown in FIG. 3E, DA8 sends Invld packet(s) to any SAs of subsystems with S copies of the data line of interest. In this example, DA8 sends Invld packets to SA1 and SA4. DA8 is also responsible for sending a data packet together with the #_Invld to RA2.

Subsequently, as shown in FIG. 3F, RA2 counts the number of incoming Invld_ack from SA1 and SA4 thereby avoiding the corner case illustrated by FIGS. 2A–2D.

Unfortunately, the above-described brute-force handshaking solution for handling and/or reducing corner cases is inefficient because of the excessive number of handshaking control packets. These extra control packets substantially increase the network traffic. In other words, the "cure" for the infrequent but disastrous corner cases substantially degrade the efficiency of the network.

Hence, there is a need for a simple and streamlined cache coherency protocol which handles and/or reduces corner cases without substantially increasing network traffic. Advantages of the present invention include reduction of complicated race conditions resulting from the corner cases, ease of formal verification of the protocol due to the reduction of the race conditions, and increased reliability of the resulting cache coherent computer system.

SUMMARY OF THE INVENTION

The present invention provides an efficient streamlined cache coherent protocol for a multi-processor multi-cache computing system. Each subsystem includes at least one processor and an associated cache and directory. The subsystems are coupled to a global interconnect via global interfaces.

In one embodiment, each global interface includes a request agent (RA), a directory agent (DA) and a slave agent (SA). The RA provides a subsystem with a mechanism for sending read and write requests to the DA of another subsystem. The DA is responsible for accessing and updating its home directory. The SA is responsible for responding to requests from the DA of another subsystem.

Further, in accordance with the invention, each subsystem also includes a blocker. In this embodiment, each blocker is coupled to a DA and is associated with a home directory. All requests for a cache line are screened by the blocker associated with each home directory. Blockers are responsible for blocking new request(s) for a cache line until an outstanding request for that cache line has been serviced. Although counterintuitive, since blocking causes the new requests to be processed sequentially, a "locked" state managed by the blocker simplifies solutions by removing the few remaining corner cases.

In one embodiment, the blockers also include queues for storing pending requests. Variations and modifications to the blocker are also possible. For example, write-backs and read-to-own requests may be given priority for service over read-to-share requests.

DESCRIPTION OF THE DRAWINGS

The objects, features and advantages of the system of the present invention will be apparent from the following description in which:

FIGS. 6A–6B and 6E–6G illustrate an alternative way of blocking requests by the directory agent of FIG. 4B until an outstanding read-to-own (RTO) request has been serviced.

NOTATIONS AND NOMENCLATURE

An invalid ("I") state indicates that a node/subsystem does not have a (cached) copy of a data line of interest.

A shared ("S") state indicates that the node/subsystem, and possibly other nodes, have a shared (cached) copy of the data line of interest.

An owned ("O") state indicates that the node/subsystem is the owner, i.e. this node has a "master copy". As such, this node must write the "master copy" to another node before the cache line can be reused. It is possible for other nodes to have a shared copy of the data line of interest.

A modified ("M") state indicates that the node/subsystem has the only (cached) copy of the data line of interest.

A blocked ("B") state indicates that a read/write request is outstanding for the data line of interest.

A request agent ("RA") provides a subsystem with a mechanism for requesting access to a cached data line of interest from another subsystem.

A directory agent ("DA") provides a subsystem with a mechanism for accessing its directory to track the status of copies of its main memory.

A slave agent ("SA") provides a subsystem with a mechanism for responding to a data request from another subsystem.

DESCRIPTION OF THE PREFERRED EMBODIMENT

In the following description, numerous details provide a thorough understanding of the invention. These details include functional blocks and an exemplary cache directory to assist a designer in implementing a cost-effective cache coherent computer system. In addition, while the present invention is described with reference to a specific cache coherent scheme for an exemplary multi-cache multi-processor computer system, the invention is applicable to a wide range of caches and network architectures. In other instances, well-known circuits and structures are not described in detail so as not to obscure the invention unnecessarily.

Figure 1A:
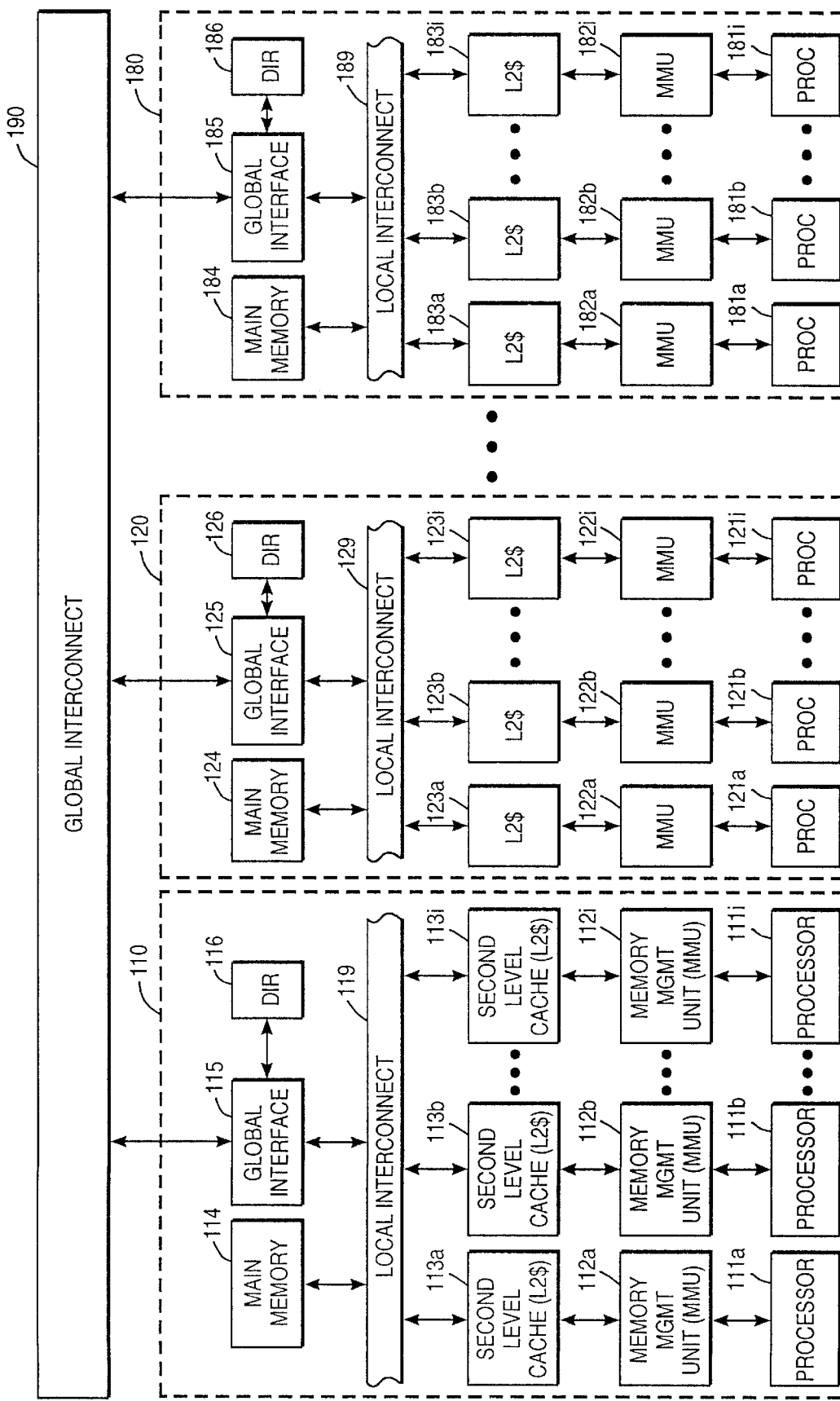
FIG. 1A is a block diagram showing a networked computer system 100 with a conventional non-uniform memory architecture (NUMA).
Figure 1B:
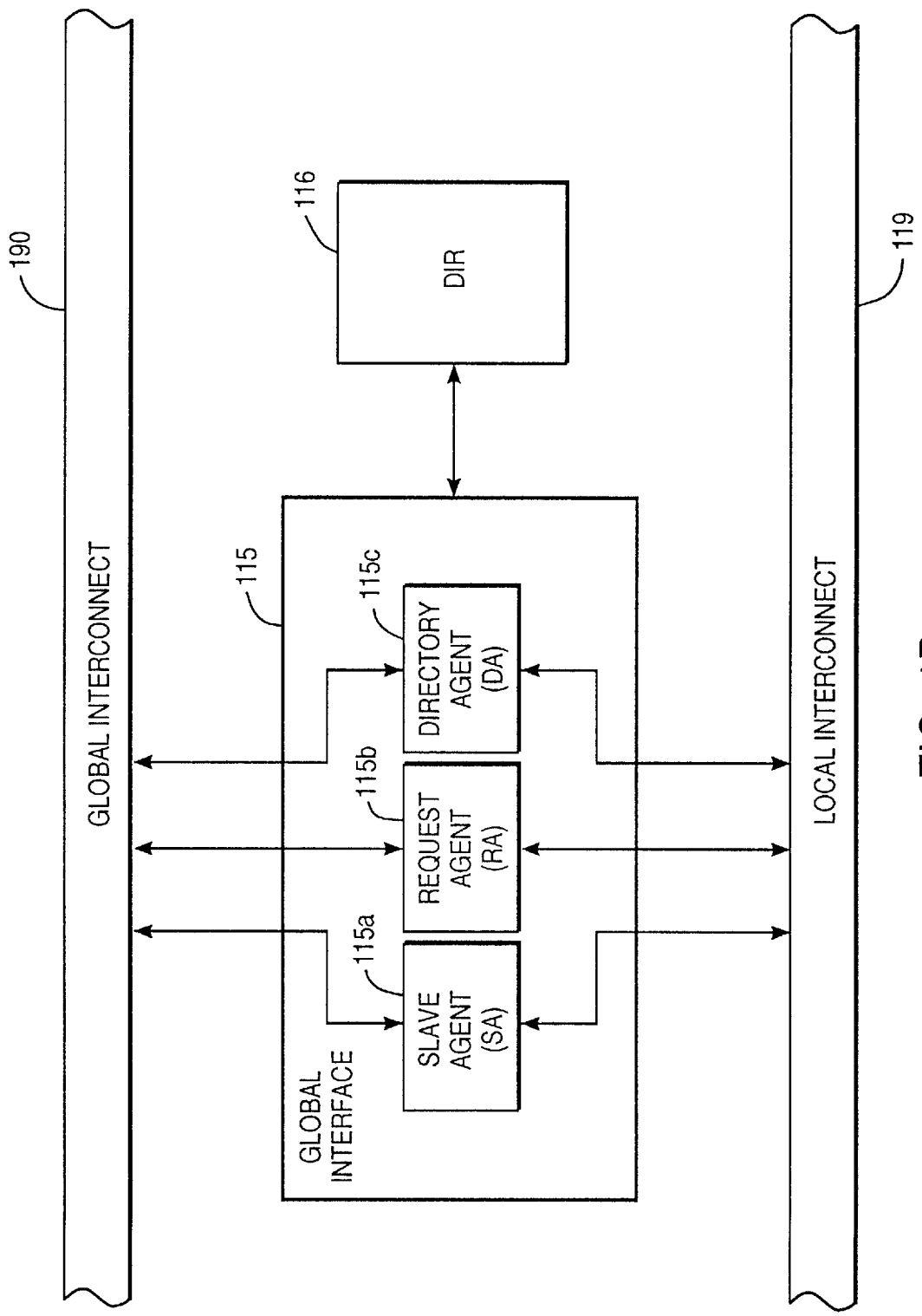
FIG. 1B is a block diagram of the global interface of the computer system of FIG. 1A which includes a directory agent ("DA"), a request agent ("RA") and a slave agent ("SA").
Figure 2A:
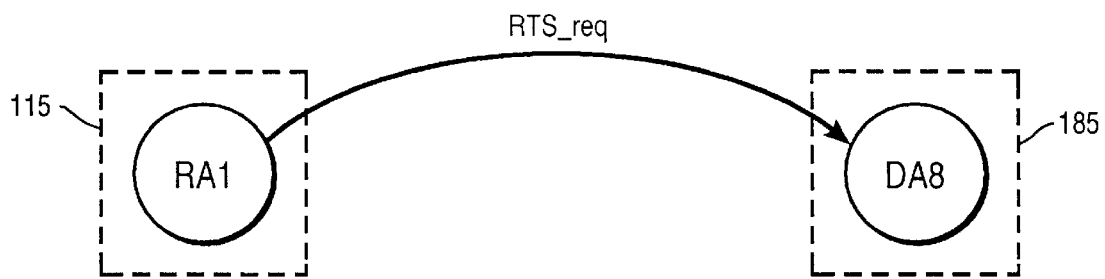
FIGS. 2A–2D illustrate a corner case in which a data packet associated with an earlier-in-time read request arrives after the cache line is prematurely invalidated by a later-in-time read-to-own request.
Figure 2B:
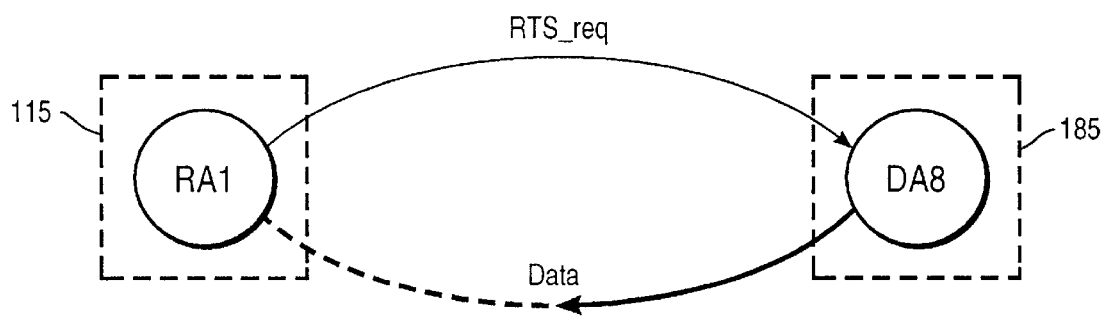
Figure 2C:
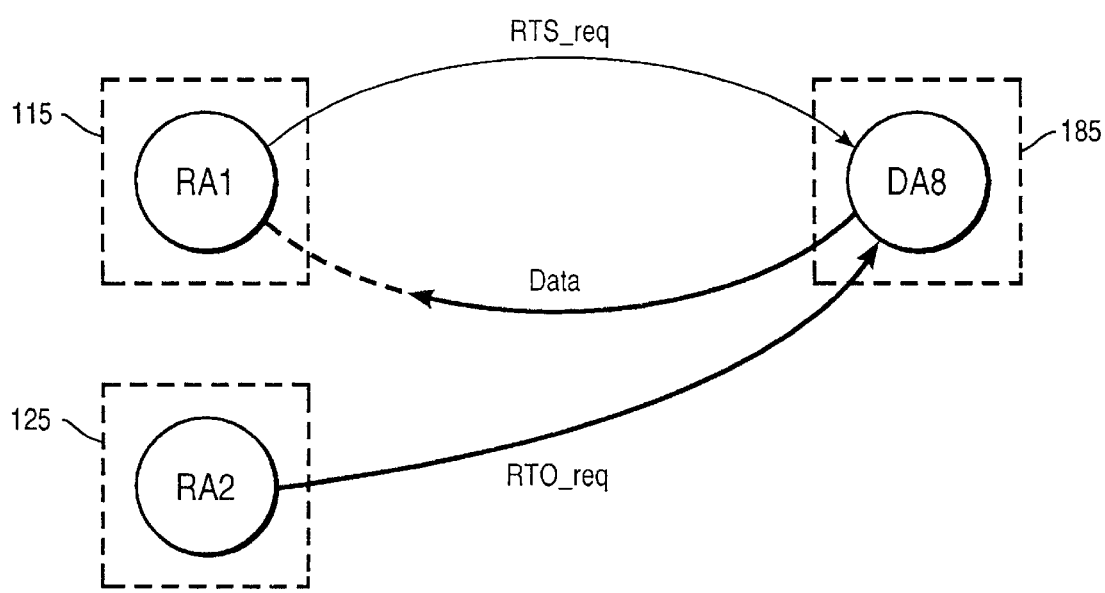
Figure 2D:
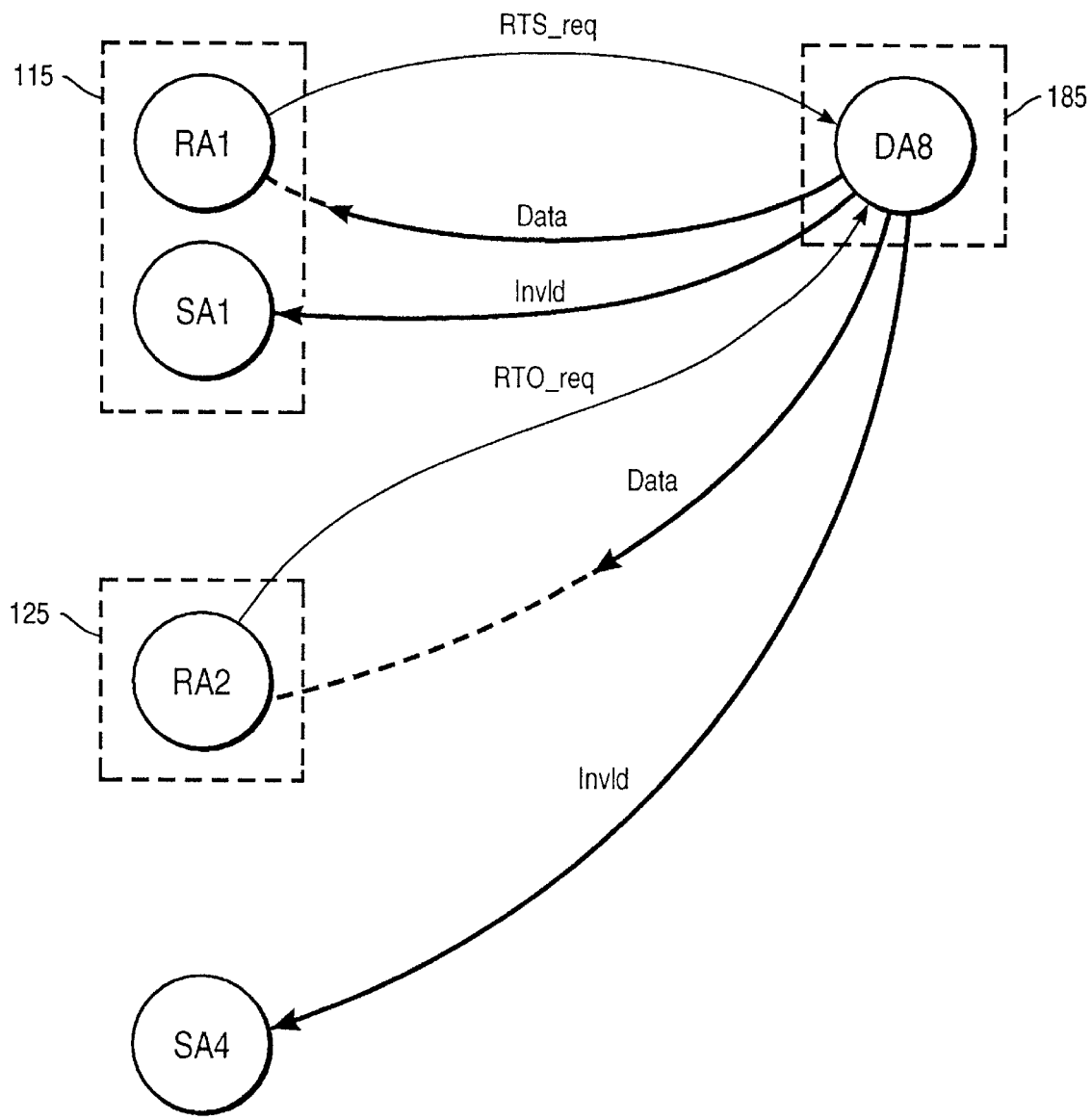
Figure 3A:
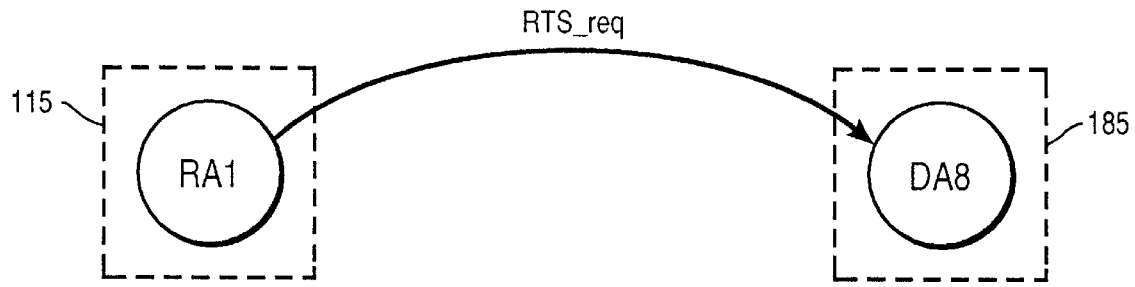
FIGS. 3A–3F illustrate a conventional handshaking protocol for solving the corner case of FIGS. 2A–2D.
Figure 3B:
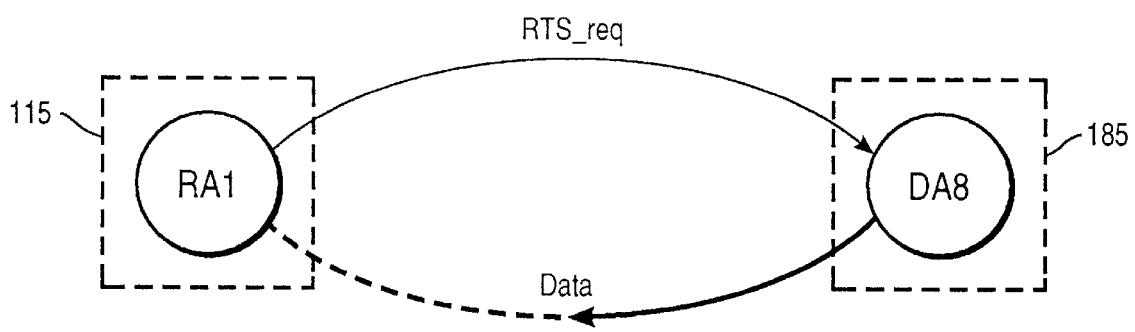
Figure 3C:
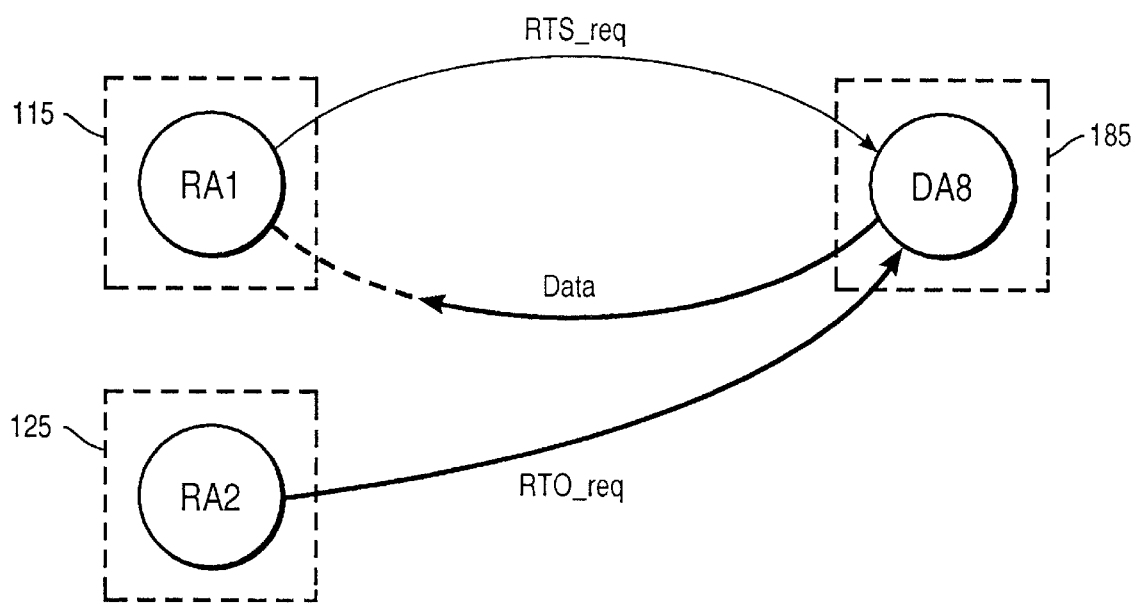
Figure 3D:
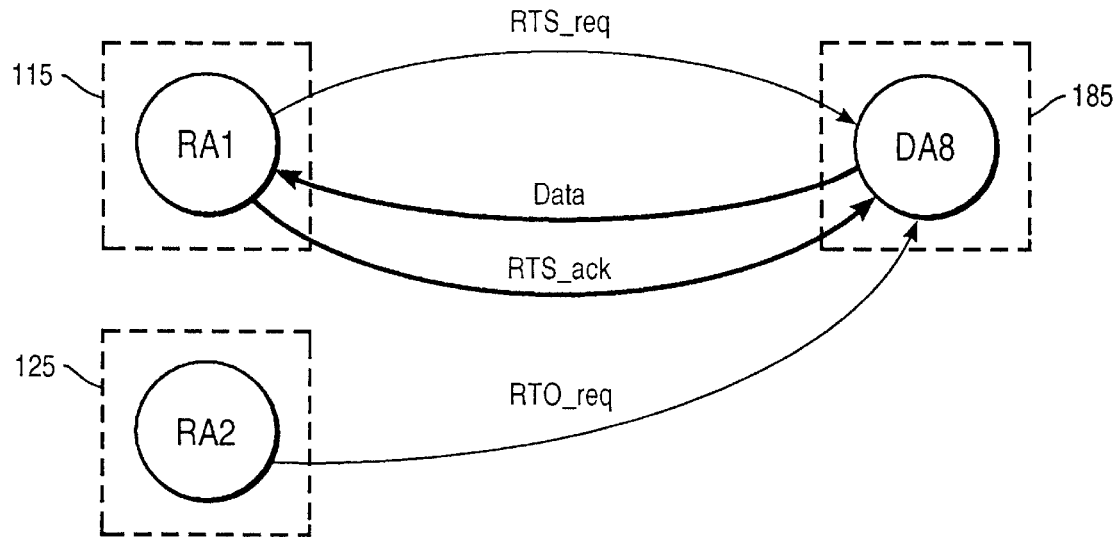
Figure 3E:
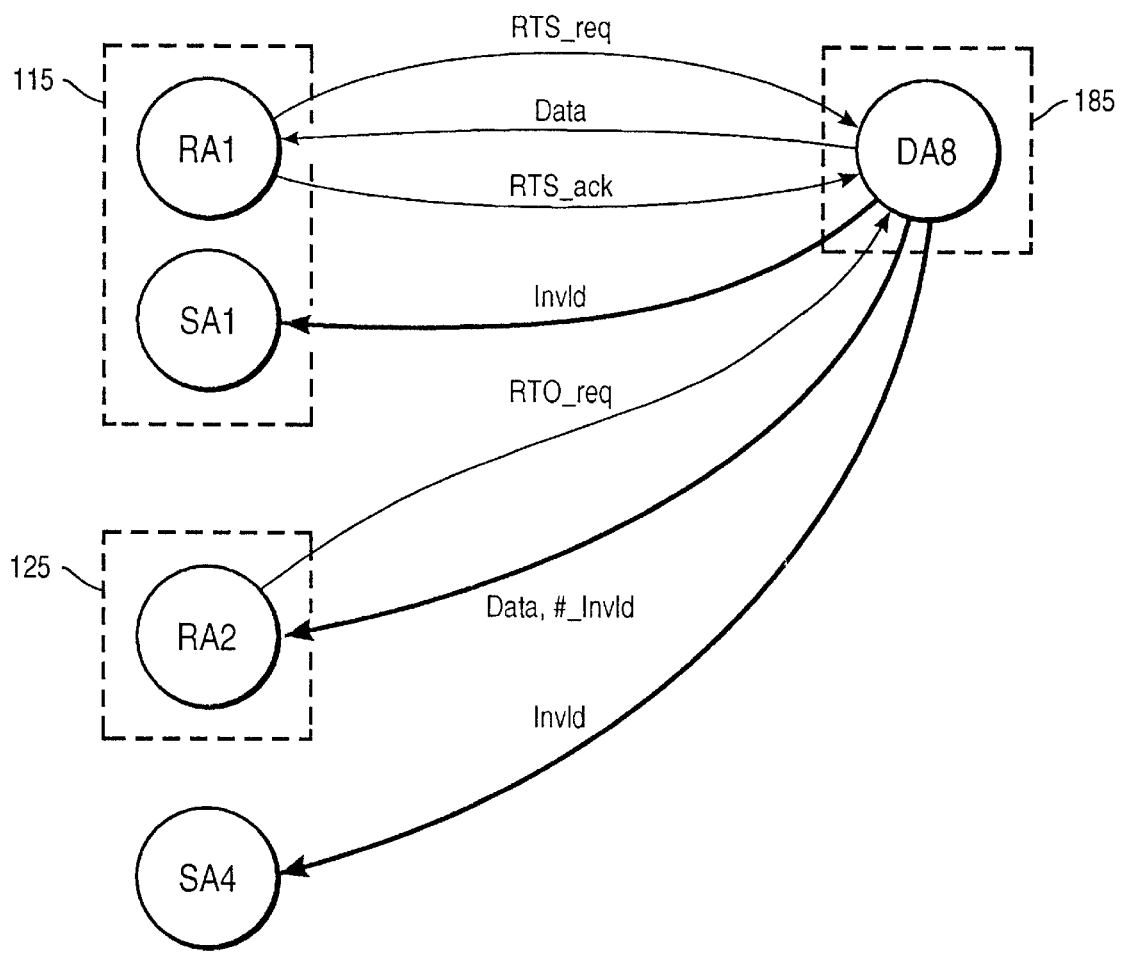
Figure 3F:
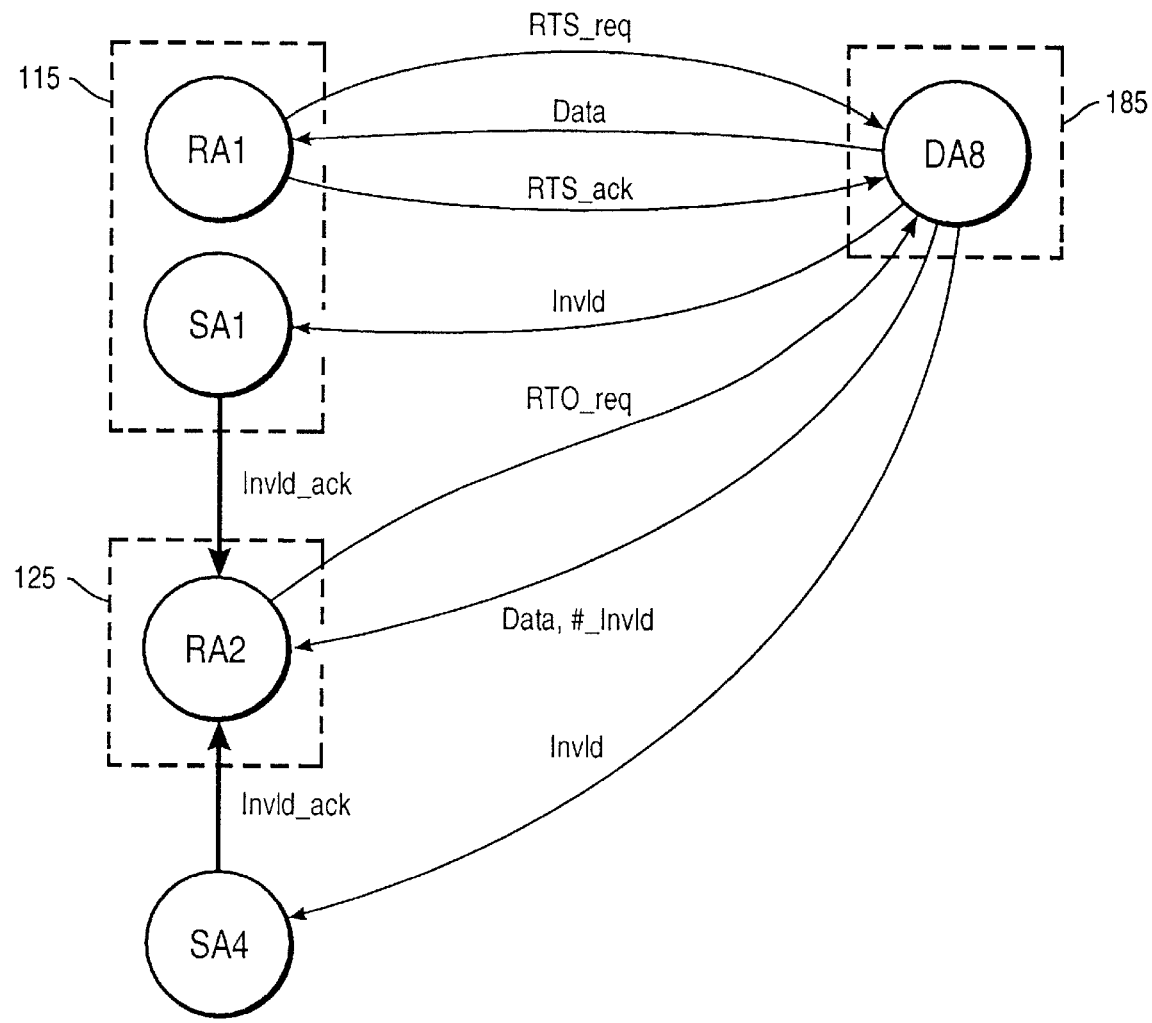
Figure 4A:
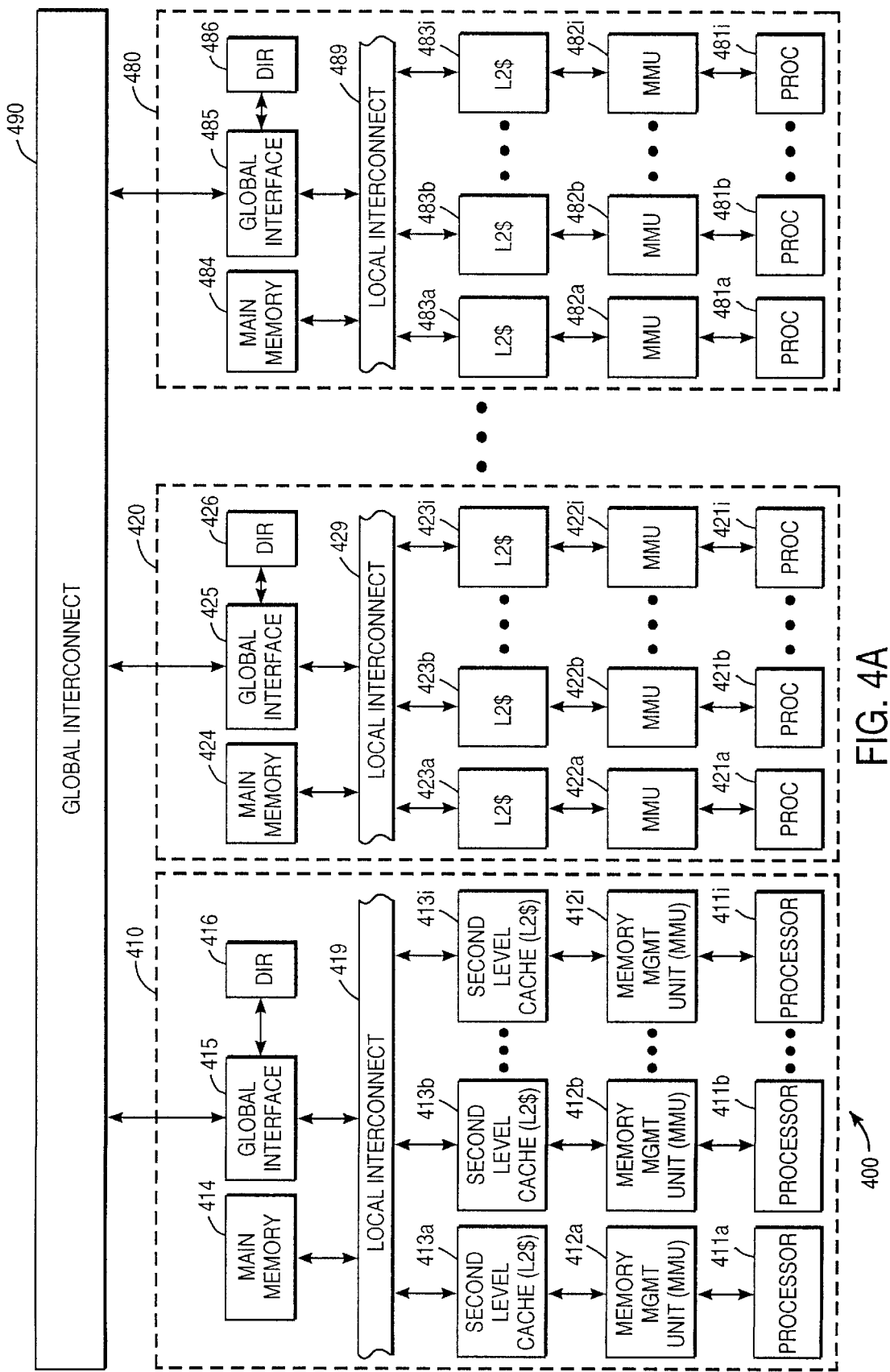
FIG. 4A is a block diagram showing an exemplary cache coherent networked computer system 400 of the present invention.

FIG. 4A is a block diagram showing an exemplary cache coherent networked computer system 400 of the present invention. System 400 includes a plurality of subsystems 410, 420, . . . 480, coupled to each other via a global interconnect 490. Each subsystem includes one or more processors, a corresponding number of memory management units (MMUs) and caches, a main memory assigned with portion of a global memory address space, a global interface and a subsystem interconnect. For example, subsystem 410 includes processors 411a, 411b . . . 411i, MMUs 412a, 412b, . . . 412i, caches 413a, 413b, . . . 413i, main memory 414, global interface 415 and subsystem interconnect 419. subsystems 410, 420, . . . 480 also include directories 416, 426, . . . 486 coupled to global interfaces 415, 425, . . . 485, respectively.

Figure 4B:
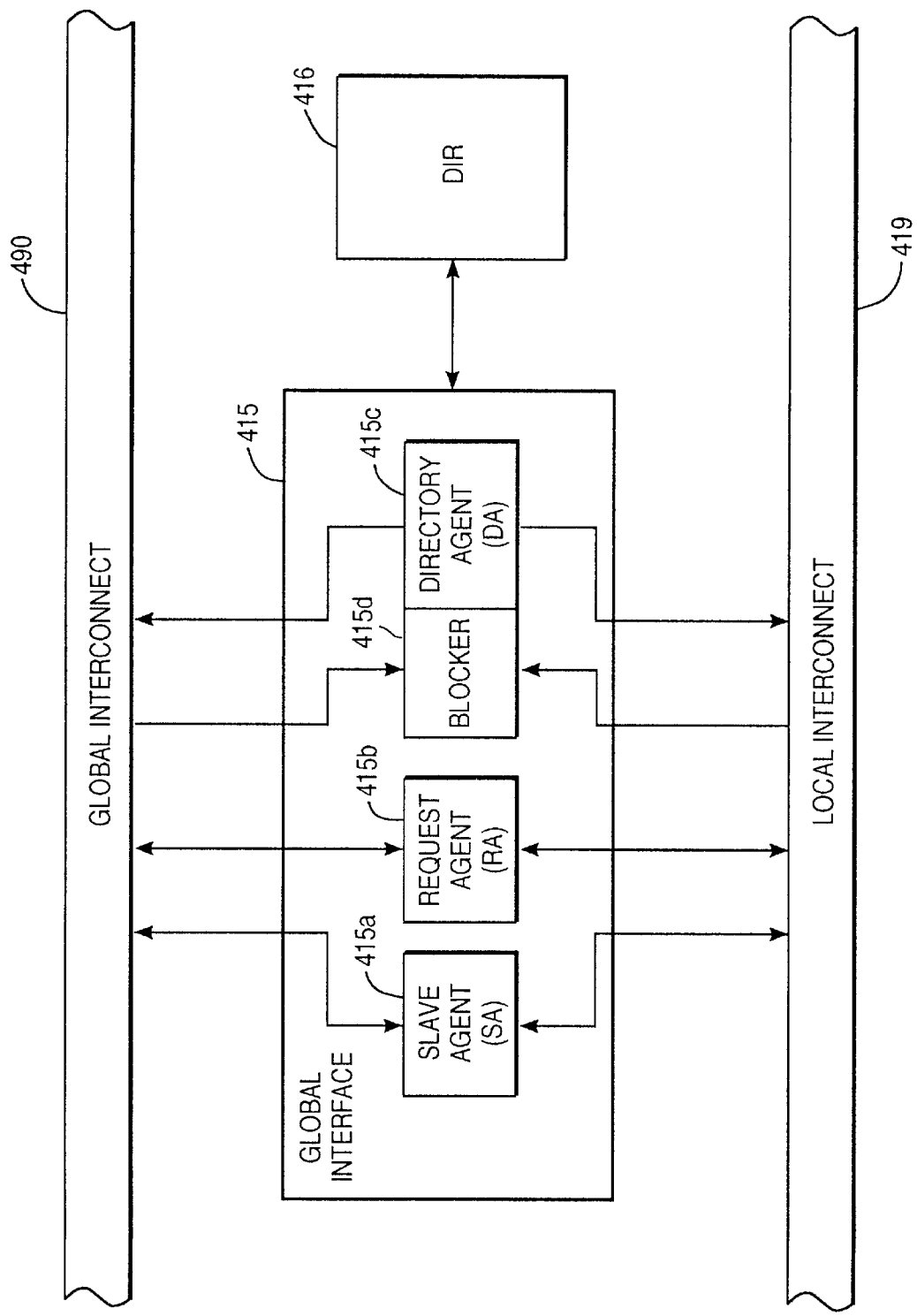
FIG. 4B is a block diagram of the global interface of the computer system of the present invention which includes a blocker, a directory agent ("DA"), a request agent ("RA") and a slave agent ("SA").

In accordance with the cache coherency scheme of the present invention, as shown in FIG. 4B, each global interface, e.g., interface 415, includes a slave agent ("SA"), a request agent ("RA"), a directory agent ("DA") and a blocker, e.g., SA 415a, RA 415b, DA 415c and blocker 415d. Thus there is a one-to-one correspondence between each DA and each directory.

Blockers, DAs, RAs and SAs can also be incorporated in circuits separate from the respective global interfaces. Each blocker is coupled to a DA and is responsible for holding pending request(s) for cache lines while outstanding request (s) are being serviced. Note that the "blocking" functionality can be provided by directories 416, 426, . . . 486 as described below or alternatively by adding dedicated blocking logic. The dedicated blocking logic is responsible for queuing outstanding transactions and storing a cache-line address for each of the outstanding transactions. Subsequently, the dedicated blocking logic compares the address of each outstanding transaction with all the old cache-line addresses before allowing transactions to pass to the corresponding DAs. In this alternative implementation, each completion signal only needs to clear its respective address.

DAs of each subsystem are responsible for updating its associated directory with the status of each cached-line sized portion of its (home) main memory. Accordingly, for each such portion of the main memory, the directory includes a status indicating which subsystem(s), if any, have cached copies of that particular portion. In this implementation, each directory is a home directory, i.e., local directory, for a subsystem. Thus, each directory includes entries for cached copies of data lines associated with the subsystem, describing the state of cached copies in all subsystems. DAs are also responsible for forwarding the appropriate request packets to the respective SAs.

FIGS. 5A–5D illustrate example I in which subsystem 410 needs read permission, i.e., a shared (S) copy, from a data line within the home address space of subsystem 480, but is "owned" by subsystem 420.

Figure 5A:
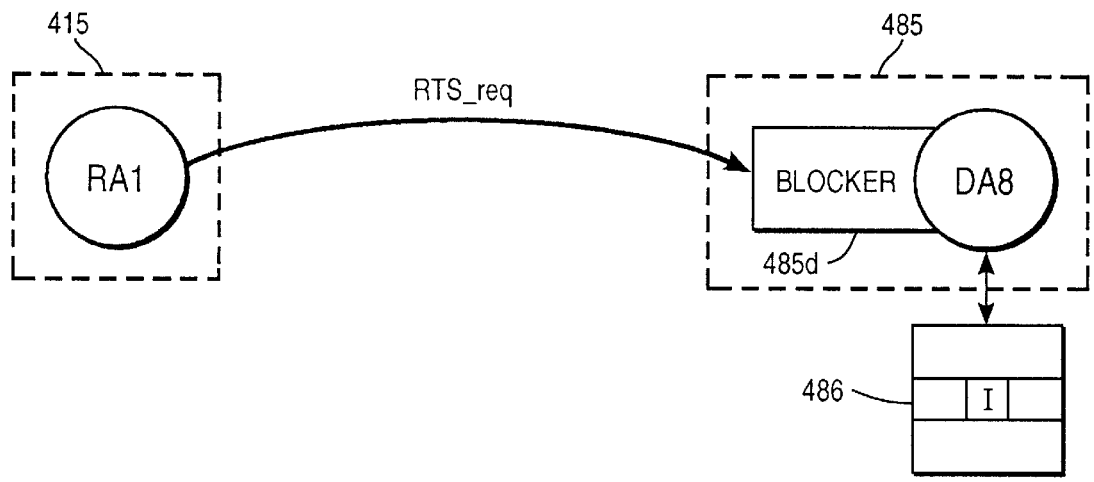
FIGS. 5A–5D illustrate an exemplary blocking of requests for the directory agent of FIG. 4B until an outstanding read-to-share (RTS) request has been serviced.

First, as shown in FIG. 5A, RA1 of global interface 415 of subsystem 410 sends a read-to-share request (RTS_req) packet to blocker 485d of global interface 485 of subsystem 480. Blocker 485d responds by causing DA8 to enter a blocked (B) state (denoted by the "dotted" circle), thereby freezing new requests to DA8 for the data line of interest.

Figure 5B:
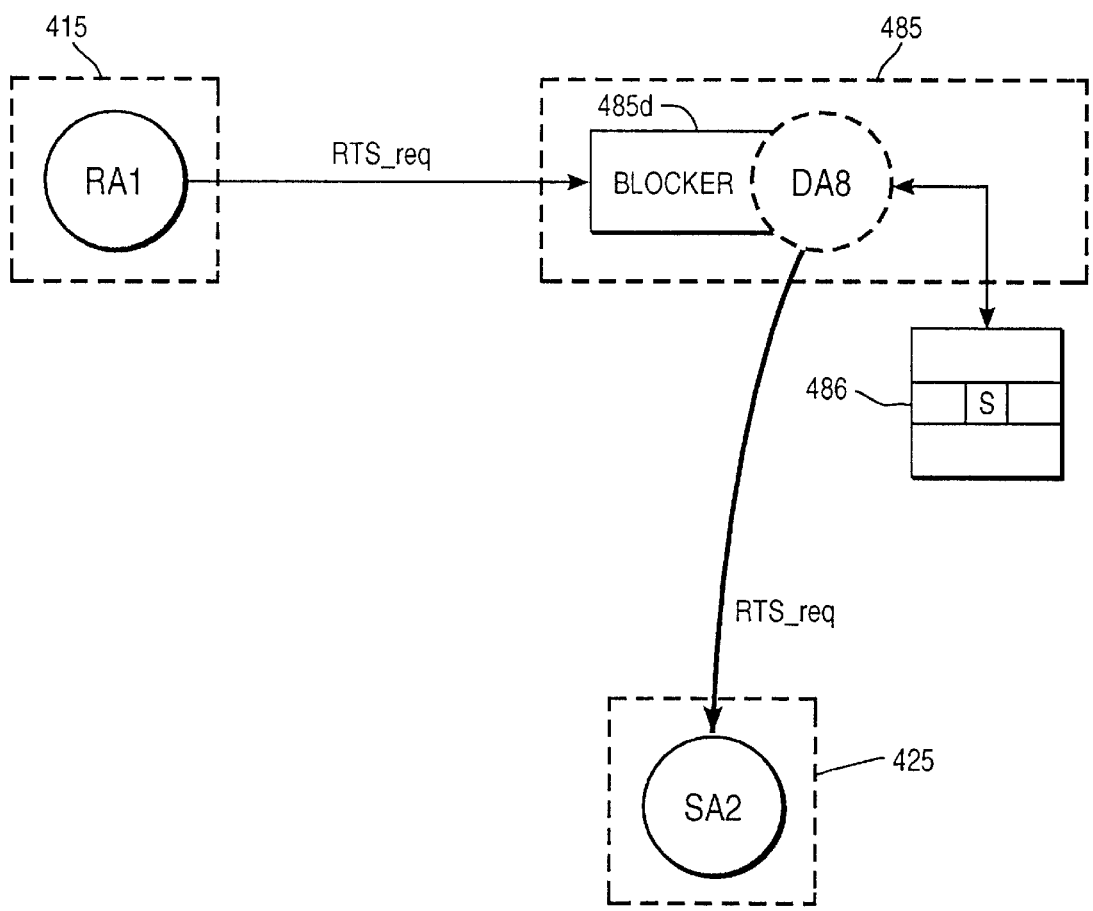

Next, as shown in FIG. 5B, DA8, now in the B state, marks its home directory 486 to reflect the requesting RA1's new status as a sharer, and forwards the RTS_req packet to slave agent SA2 of global interface 425 of subsystem 420.

The blocked ("B") state indicates that there is a write/read request outstanding and subsequent request(s) for the same data line are blocked until the pending request has been serviced. In this implementation, blocker 485d, associated with DA8, blocks new requests for the data line by temporarily storing the requests in a local first-in-first-out (FIFO) queue or by flow controlling new requests.

Figure 5C:
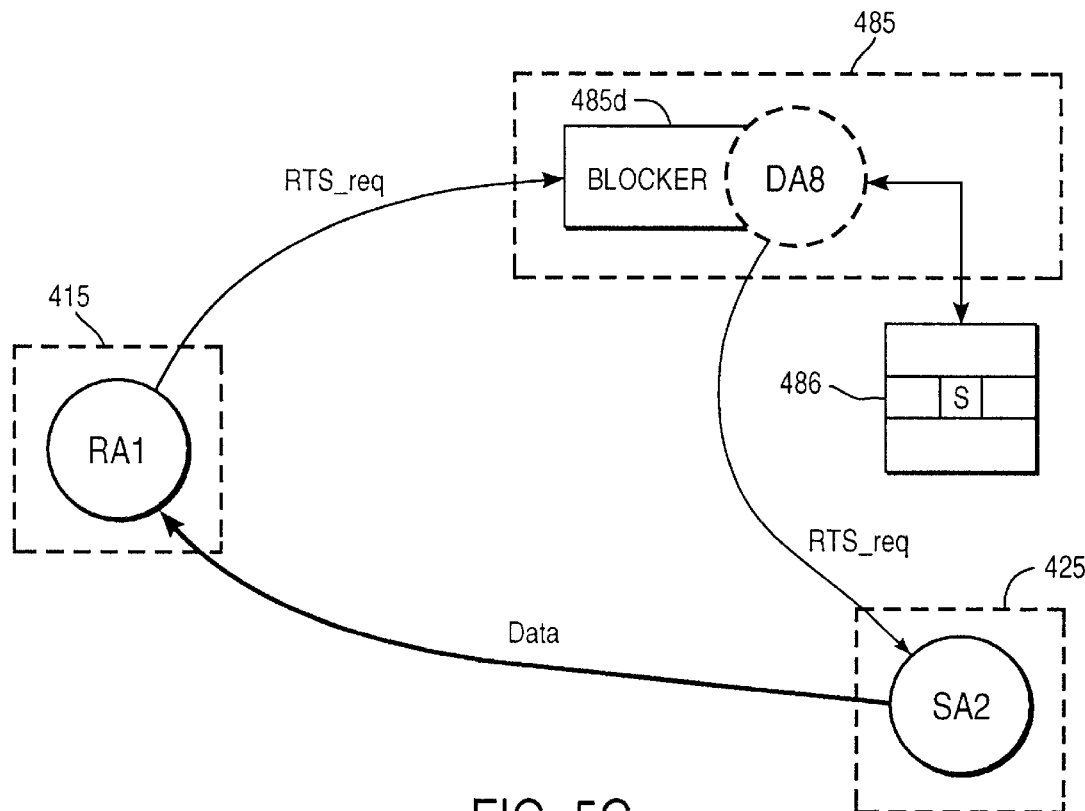

SA2 responds to the RTS_req packet by sending a data packet to RA1 and remains the "owner" of the data line, as shown in FIG. 5C.

Figure 5D:
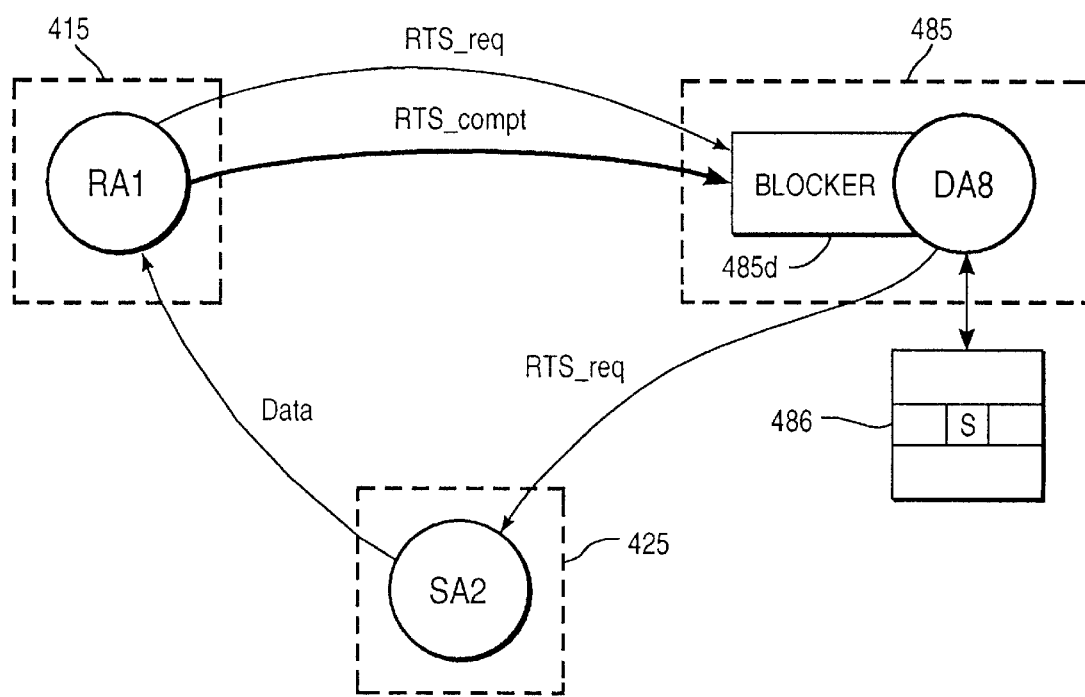

Finally, as shown in FIG. 5D, upon receipt of the data packet from SA2, RA1 sends a RTS-completion (RTS_compt) packet to blocker 485d. Blocker 485d causes DA8 to leave the B state. DA8 is now able to service any queued request for the data line of interest.

In example II illustrated by FIGS. 6A–6B and 6C–6D, subsystem 410 needs write permission, i.e., an owned (O) copy, from a data line whose home address space is in subsystem 480 but is owned by subsystem 420. In addition, a third subsystem and fourth subsystem (both not shown in FIG. 4A) have S copies of the data line.

Figure 6A:
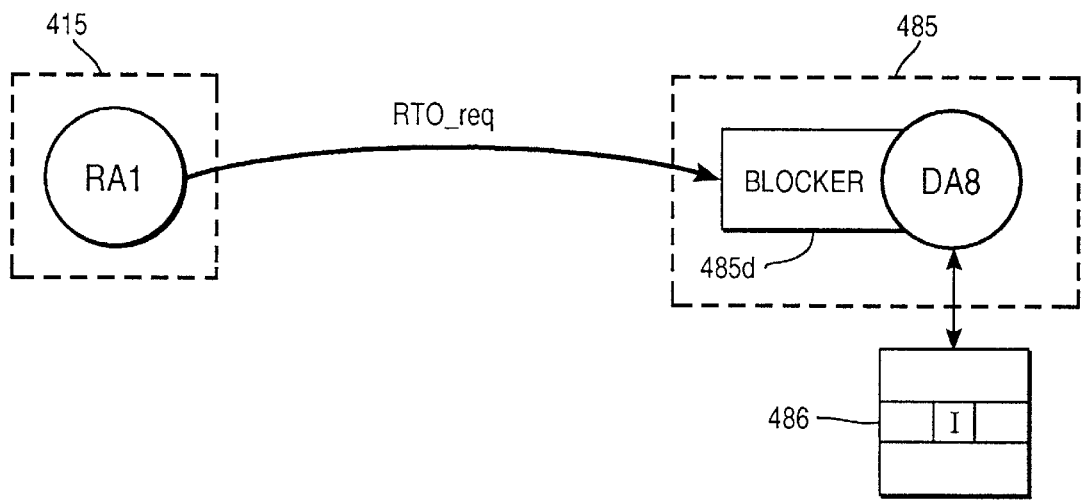
FIGS. 6A–6B and 6C–6D illustrate an exemplary blocking of requests for the directory agent of FIG. 4B until an outstanding read-to-own (RTO) request has been serviced.

First, as shown in FIG. 6A, RA1 sends a read-to-own request (RTO_req) packet to DA8 via blocker 485d.

Figure 6B:
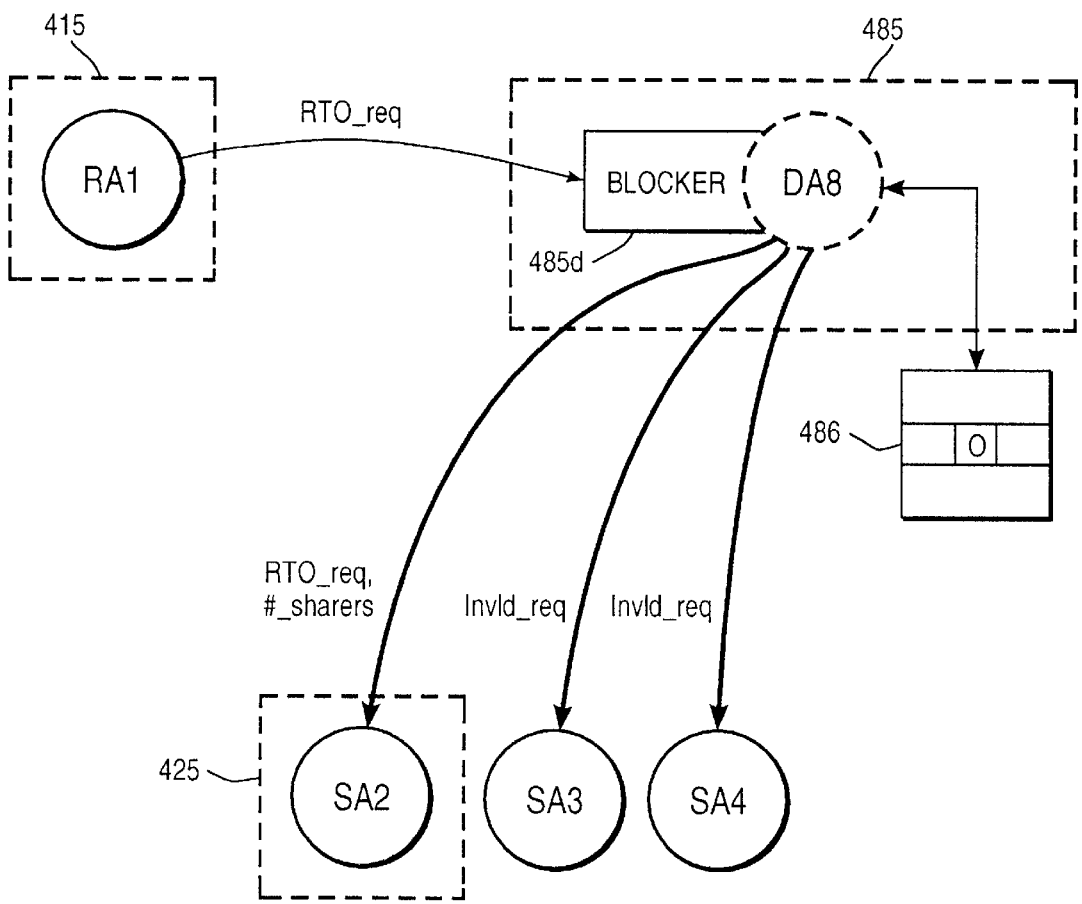

Next, as shown in FIG. 6B, blocker 485d causes DA8 to enter the B state and freezes new transactions to the cache line. DA8 marks its home directory to reflect the requester RA1's new status as the owner of the data line of interest, i.e., RA1's new status is owned (O). DA8 retrieves the number of sharers (#_sharers), two sharers in this example, of this data line from its directory, appends the #_sharers to the RTO_req packet and forwards the RTO_req packet to SA2. DA8 is also responsible for sending invalidate request (Invld_req) packets to SA3 and SA4 of the third and fourth subsystems, respectively. The Invld_req packets also include the identity of requesting RA1.

Figure 6C:
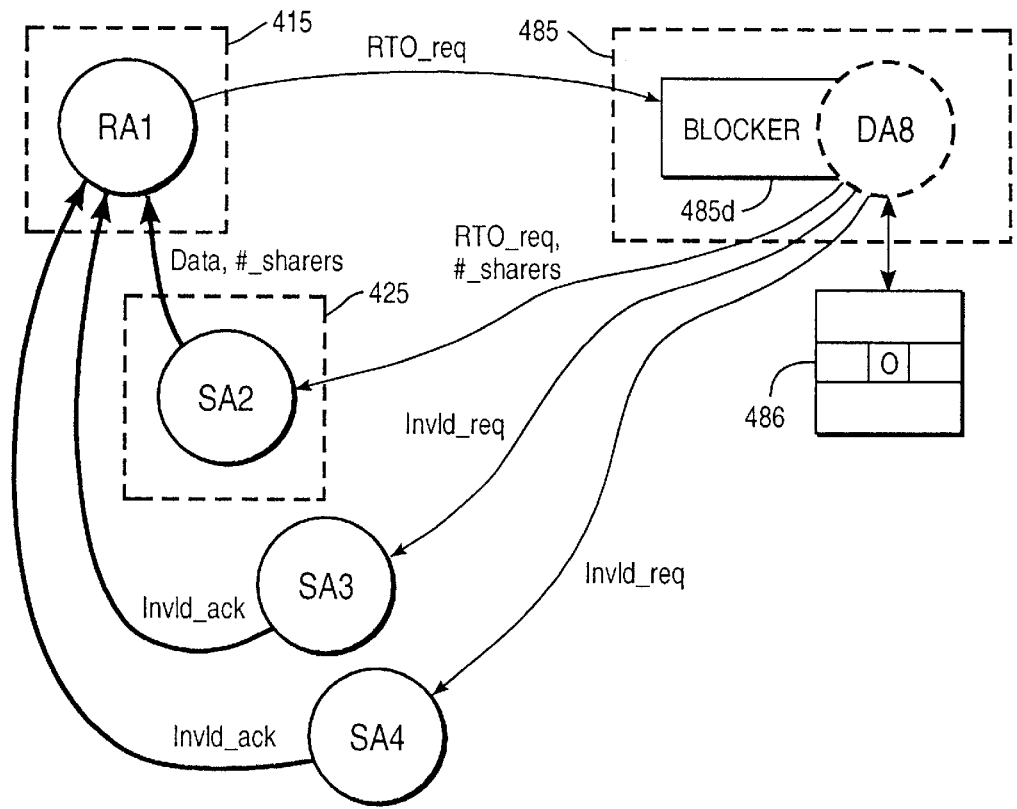

FIG. 6C shows SA2 responding to arrival of the RTO_req packet by invalidating its copy of the data line, and sending a data packet to RA1 together with the total number of sharers. Upon receipt of the respective Invld_req packets from DA8, both SA3 and SA4 send invalid acknowledgment (Invld_ack) packets to RA1 and also invalidate their respective S copies.

Figure 6D:
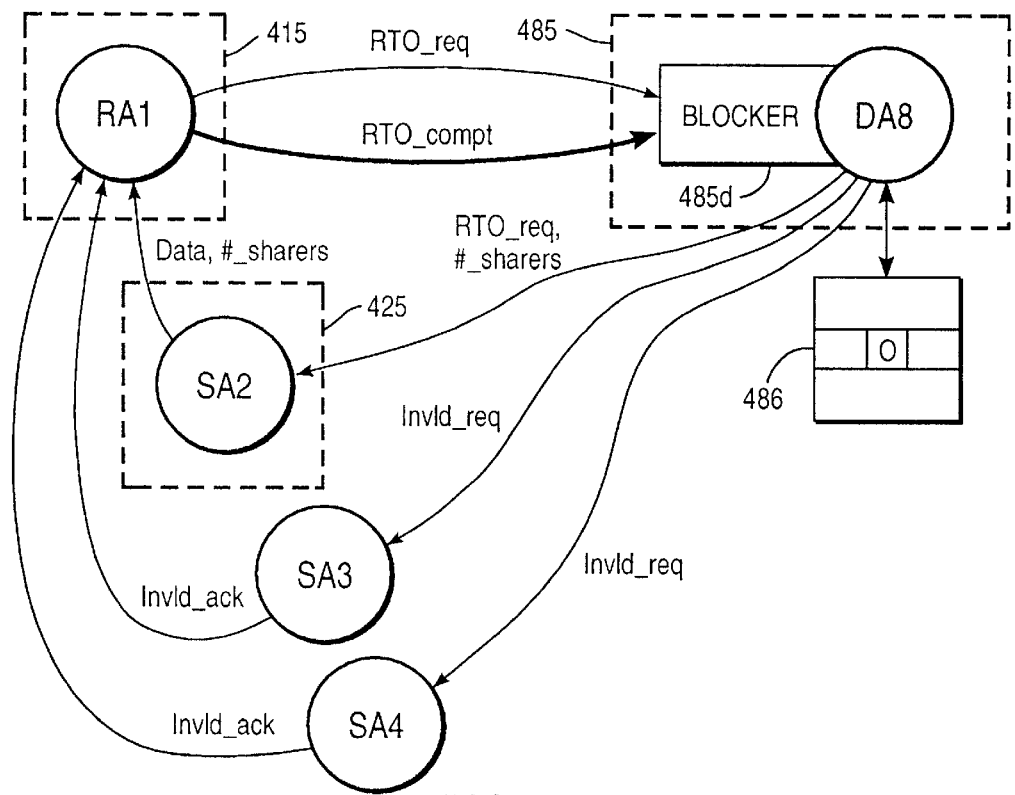

Finally, as shown in FIG. 6D, after the arrival of the data packet from SA2 and after the arrival of the correct number of Invld_ack packets, i.e., the #_sharers, from SA3 and SA4, RA1 sends a RTO-completion (RTO_compt) packet to blocker 485d. The RTO_compt packet completes a "three-hop dirty reply" sequence. DA8 responds to the RTO_compt packet by leaving the B state and by releasing the data line of interest.

Note that the protocol illustrated by example II can be simplified by sending #_sharers together with the Invld_req packet(s). Accordingly, whenever no data is required by RA1 of the requesting subsystem, the SA2 does not need to send a packet to RA1 for the sole purpose of sending the #_shares to RA1. In other words, RA1 can obtain the #_sharers from either SA3 or DA4, thereby reducing the network traffic by one packet.

Figure 6E:
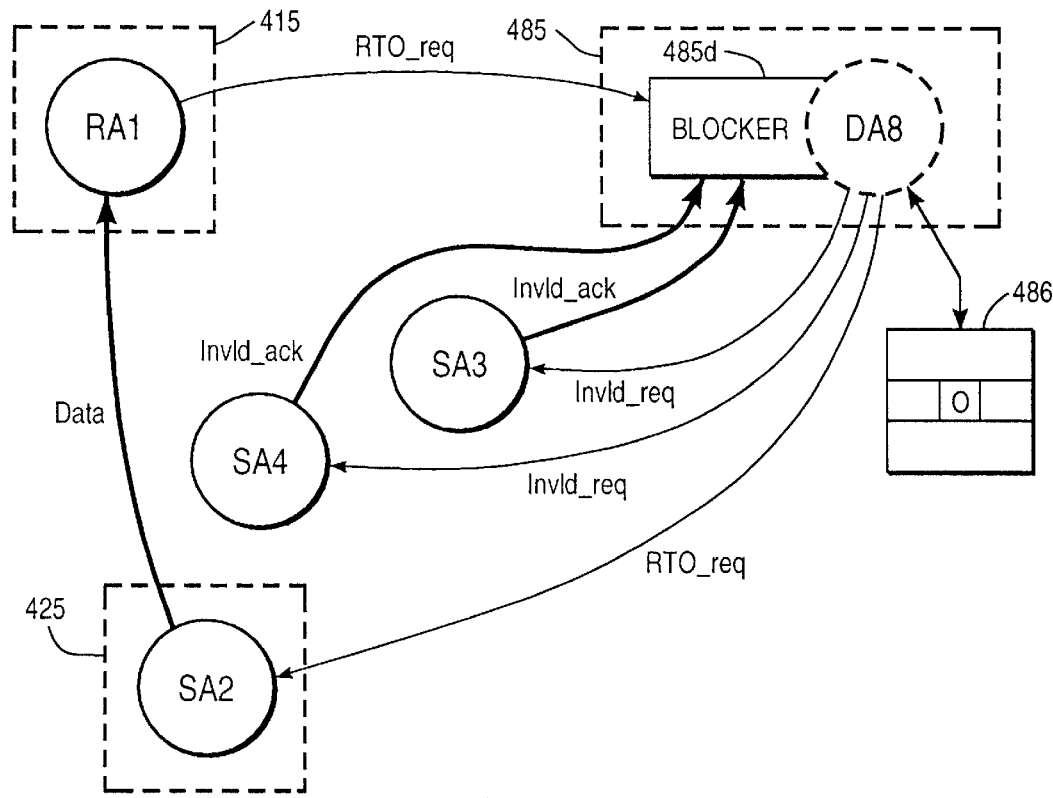

An alternative example III is illustrated by FIGS. 6A–6B and 6E–6G. Starting with FIGS. 6A–6B as in example II, instead of sending Invld_ack packets to the requesting RA1 as shown in FIG. 6C of example II, sharers SA3, SA4 send the Invld_ack packets to the blocker of the home DA, i.e., blocker 485d of home subsystem 480, as shown in FIG. 6E. Consequently, home DA8 is responsible for counting the correct number of Invld_ack packets and also responsible for receiving the RTO-compt packet from RA1 before leaving the B state. In this example, DA8 no longer needs to send #_sharers to other nodes since SA3 and SA4 send Invld_ack packets to blocker 485d instead of RA1.

Figure 6F:
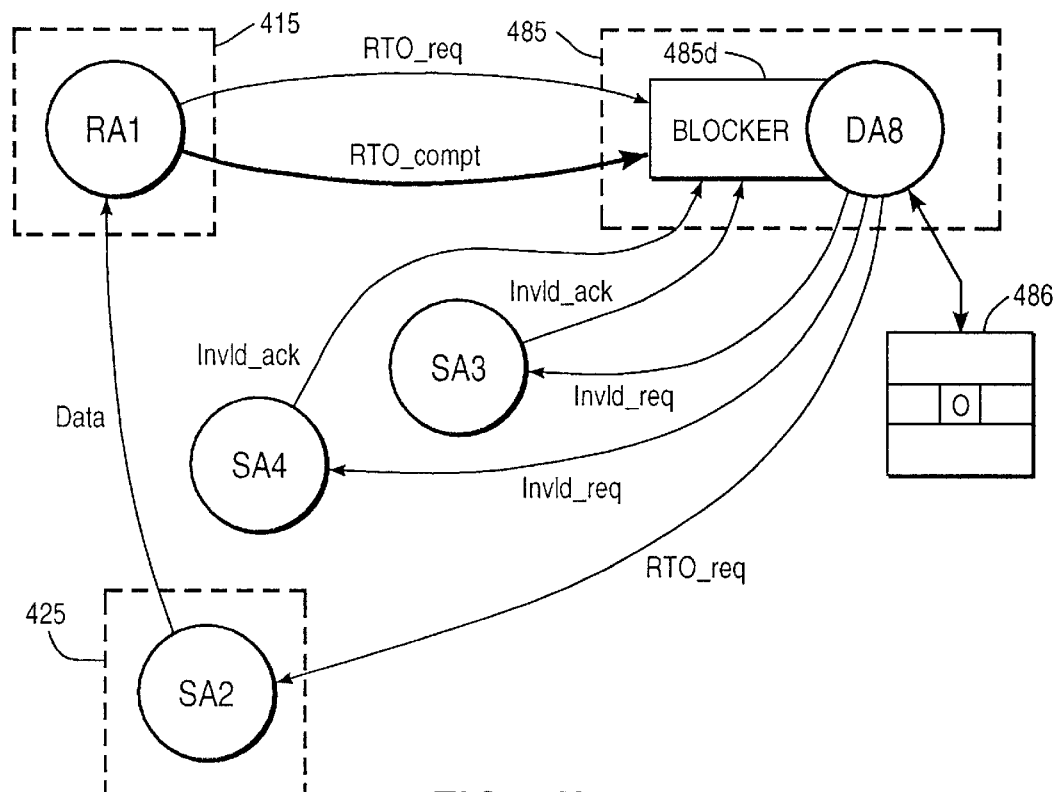

Next, as shown in FIG. 6F, RA1 sends the RTO_compt packet to blocker 485d after receiving the data packet from SA2. Blocker 485*d* is responsible for counting the Invld_acks packets and recognizing the arrival of the RTO_compt packet.

Figure 6G:
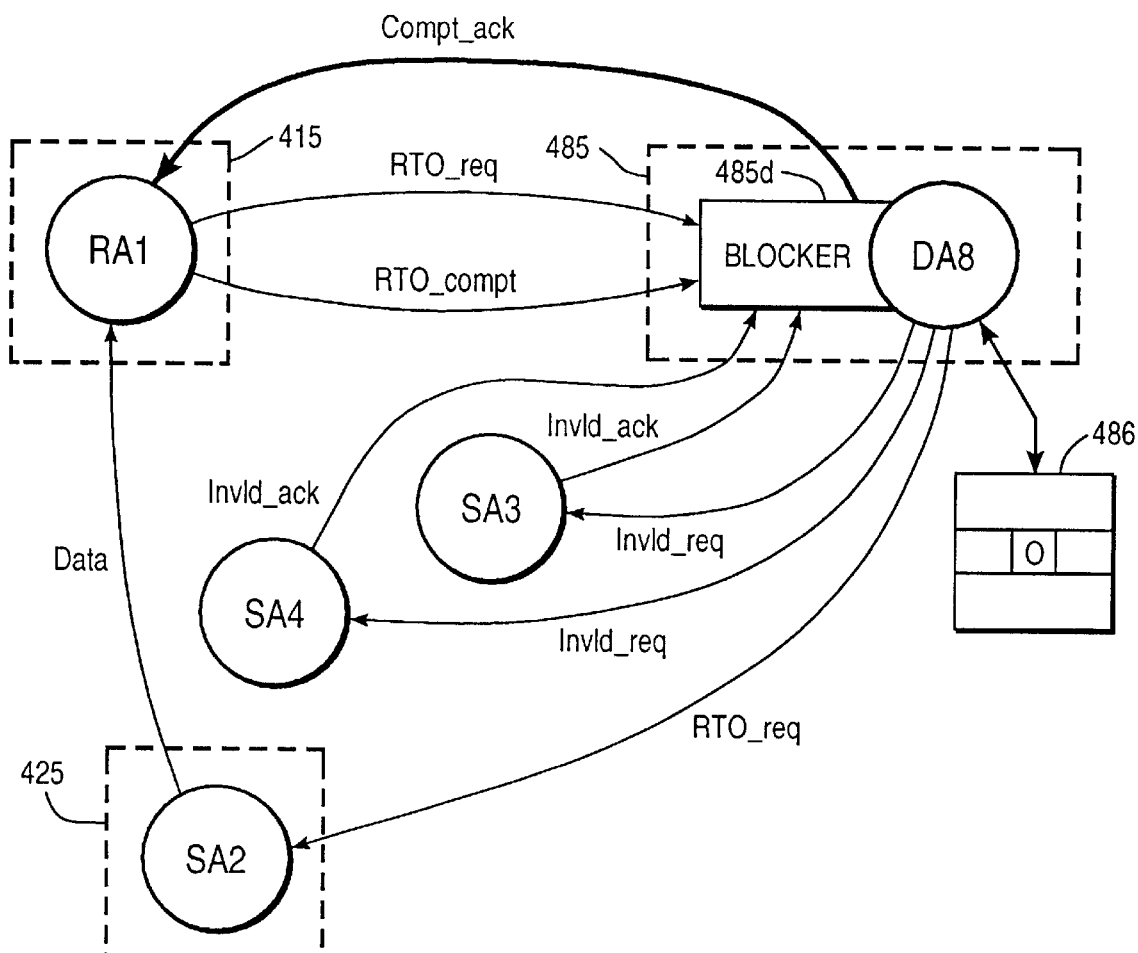

Finally, as shown in FIG. 6G, Blocker 285*d* sends a Completion_acknowledge (Compt_ack) packet to RA1 upon receipt of all expected Invld_ack(s), in this example, from both SA3 and SA4. The Compt_ack packet completes the "four-hop dirty reply" sequence and DA8 can now leave the B state and release the data line of interest.

Figure 7A:
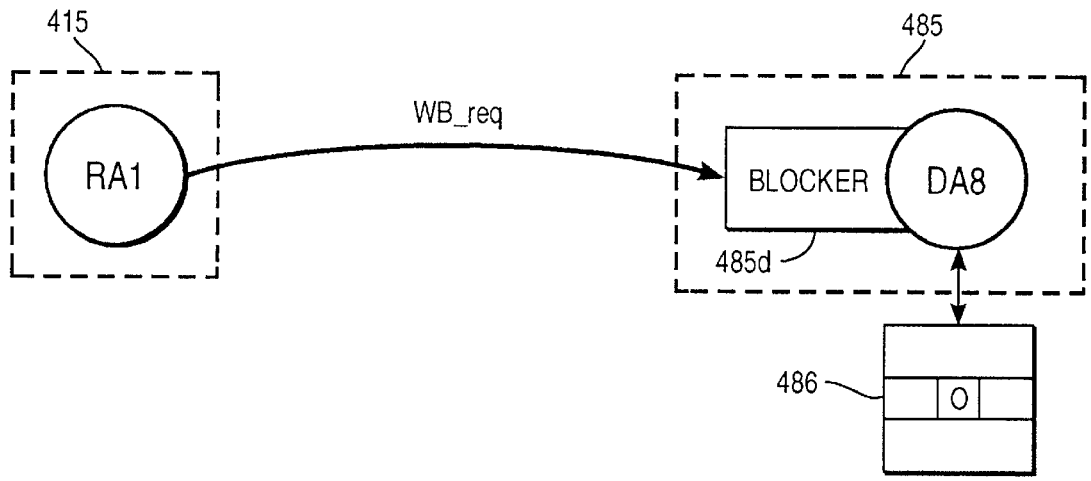
FIGS. 7A–7C illustrate an exemplary blocking of requests for the directory agent of FIG. 4B until an outstanding write-back (WB) request has been serviced.
Figure 7B:
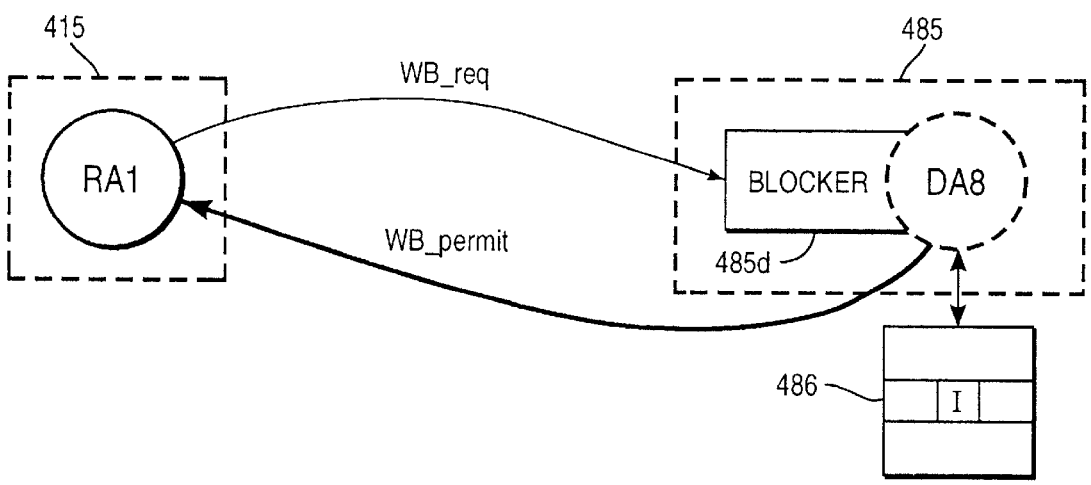
Figure 7C:
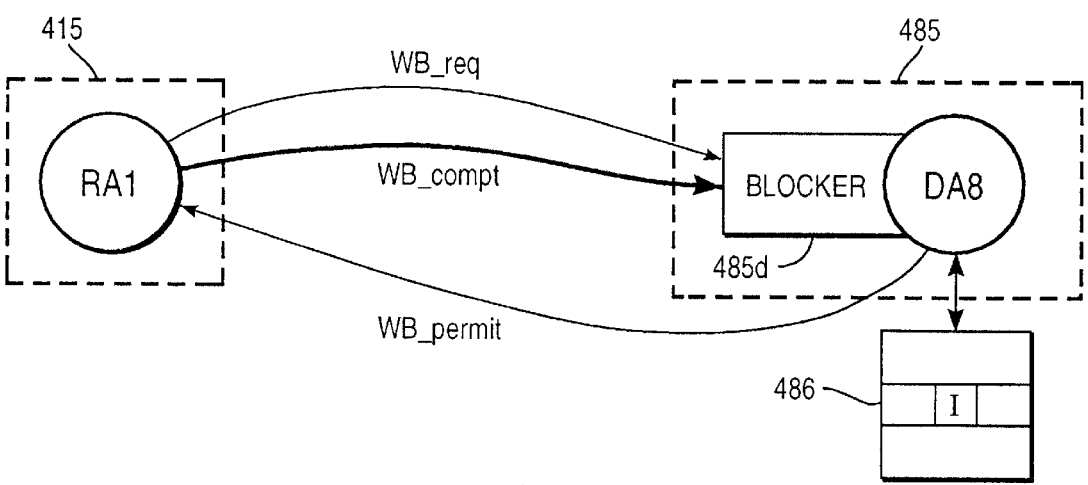

FIGS. 7A–7C illustrate example IV in which a remote owner writes back to the host directory, e.g., subsystem 410 is the "owner" and sends a write-back request (WB_req) to subsystem 420.

First, as shown in FIG. 7A, RA1 of global interface 415 of subsystem 410 sends a WB_req packet to DA8 of global interface 485 of subsystem 480. DA8 responds by entering the B state and freezing new transactions to the cache line.

Next, as shown in FIG. 7B, DA8 marks its home directory to reflect the requester RA1's new status as invalid, and sends a write-back-permission (WB_permit) back to RA1.

Finally, RA1 sends the data to DA8 via a write-back-complete (WB_compt) packet which includes data to be replaced, as shown in FIG. 7C. Upon receiving the WB_compt packet at DA8, the write-back transaction is complete and blocker 485*d* releases the data line of interest by leaving the B state. Note that RA1 only leaves the "O" state after RA1 has received the WB_permit packet. Waiting for the WB_permit packet from blocker 485*d* eliminates the corner case in which a subsequent read request to RA1 fails because RA1 replaced the cache line (using a write back) before the subsequent read request reaches RA1.

Various optimizations of the above described cache coherent mechanism are possible. For example, instead of a single FIFO queue for storing all outstanding read and write requests, RTO requests are stored in a separate queue and given priority for processing so that RTO requests are serviced first. Prioritizing write-back requests improves processor performance because typically processors of subsystems protect their respective critical code sections using a shared "key". A processor locks the key before executing its critical code section and releases the key upon completion. Thereafter, a second processor can lock the key to execute its critical code section. Hence, by giving RTO requests priority, the key can be released rapidly, allowing other processors to quickly gain access to the key.

In another embodiment, selective blocking is provided. For example, blocking is selectively activated when an RTS request or a write-back request is outstanding, but is deactivated when a RTO request is outstanding.

Subsystem 410, 420 . . . 480 of computer system 400 can be arranged in many configurations. For example, system 400 may be configured as a wide area network (WAN), such as the internet, a local area network (LAN) or a tightly coupled multiprocessor system.

Other modifications and additions are possible without departing from the spirit of the invention. For example, instead of blocking all read and write requests arriving at the DA, RTO requests whenever a request is outstanding, read-to-share requests are blocked only if there is a read-to-own or a write-back request outstanding. In addition, each subsystem may be equipped with additional circuitry to perform "local data forwarding" so that processors within a subsystem can provide data to each other without accessing the host directory of another subsystem. Hence, the scope of the invention should be determined by the following claims.

What is claimed is:

1. A cache accessing method for a multiprocessing computer system having a plurality of subsystems coupled to each other via a global interconnect, each of said subsystems including a main memory, a cache and a global interface and wherein each said caches includes a plurality of cache lines, the method comprising:

sending a first request from a first subsystem for a cache line of a second subsystem via said global interconnect;

receiving said first request at said second subsystem;

blocking all new requests for said cache line of said second subsystem sent via said global interface and received after said receiving said first request;

receiving a completion acknowledgment from said first subsystem indicating that said first request has been serviced, said first subsystem sending said completion acknowledgment responsive to receiving data corresponding to said first request and an invalidate acknowledgment from a third subsystem;

terminating said blocking responsive to said receiving said completion acknowledgment;

queuing said all requests received after said receiving said first request until said first request has been serviced; and processing a second request for said cache line of said second subsystem.

2. The method of claim 1 wherein said request is a read request.

3. The method of claim 2 wherein said read request is a read-to-share request.

4. The method of claim 2 wherein said read request is a read-to-own request.

5. The method of claim 2 further comprising the step of:

sending data from said second subsystem to said first subsystem in response to said read request.

6. The method of claim 5 further comprising the steps of:

sending an invalidate request from said second subsystem to a third said subsystem in response to said read request; and sending an invalidate acknowledgment from said third subsystem to said first subsystem in response to said invalidate request.

7. The method of claim 2 further comprising the steps of:

forwarding said read request from said second subsystem to a third said subsystem; and sending data from said third subsystem to said first subsystem.

8. The method of claim 7 further comprising the steps of:

sending an invalidate request from said second subsystem to a fourth said subsystem in response to said read request; and sending an invalidate acknowledgment from said fourth subsystem to said first subsystem in response to said invalidate request.

9. The method of claim 8 wherein said blocking step is terminated when said second subsystem receives a completion acknowledgment from said first subsystem indicating that said data and said invalidate acknowledgment have arrived at said first subsystem.

10. The method of claim 2 wherein said second subsystem includes a directory and said step of receiving said read request includes the step of updating said directory.

11. The method of claim 1 wherein said request is a write-back request.

12. The method of claim 11 further comprising the steps of:

sending a write-back-permission from said second subsystem to said first subsystem in response to said write-back request.

13. The method of claim 12 wherein said blocking step is terminated when said second subsystem receiving a completion acknowledgment with data from said first subsystem indicating that said write-back-permission has arrived at said first subsystem.

14. The method of claim 11 wherein said second subsystem includes a directory and said step of receiving said write-back request includes the step of updating said directory.

15. The method of claim 1 wherein said second request for said cache line of said second said subsystem includes a read request and a write-back request and said queuing includes a queuing of said read request in a read queue and said write-back request in a write queue.

16. The method as recited in claim 1 wherein said all new requests include said second request for said cache line of said second subsystem sent via said global interface.

17. The method as recited in claim 16 wherein said second request for said cache line of said second subsystem sent via said global interface originates from said first subsystem.

18. The method as recited in claim 1 wherein said second request for said cache line of said second subsystem sent via said global interface originates from a third subsystem.

19. The method as recited in claim 1 wherein said all new requests include a third request for said cache line of said second subsystem sent via said global interface and originated from said first subsystem.

20. The method as recited in claim 19 wherein said all new requests include said third request for said cache line of said second subsystem sent via said global interface and originated from a third subsystem.

21. The method of claim 19 wherein said third request for said cache line of said second subsystem sent via said global interface includes a read request and a write-back request.

22. A multiprocessing computer system comprising:

a first subsystem including a first main memory coupled to a first local interconnect, a first cache coupled to said first local interconnect, a first processor coupled to said first cache, and a first global interface coupled to said first local interconnect;

a second subsystem including a second main memory coupled to a second local interconnect, a second cache coupled to said second local interconnect, a second processor coupled to said second cache, and a second global interface coupled to said second local interconnect;

a global interconnect coupled to said first global interface of said first subsystem and said second global interface of said second subsystem;

wherein said global interconnect provides a communication path between said first subsystem and said second subsystem and wherein said first global interface is configured to pass a first request from said second subsystem for a cache line of said first cache of said first subsystem sent via said global interconnect and to block all new requests for a cache line of said first cache sent via said global interconnect and received after said first request until said first request for said cache line has been serviced, and wherein said second global interface is configured to transmit a completion acknowledgment to said first global interface upon said global interconnect, and wherein said completion acknowledgment indicates that said first request has been serviced, and wherein said first global interface is configured to terminate blocking said all new requests upon receiving said completion acknowledgment, and wherein said all new requests are received from said global interconnect.

23. The multiprocessing computer system of claim 22 wherein said first global interface further includes a directory configured to store a status of said cache line.

24. The multiprocessing computer system of claim 22 wherein said first global interface further includes a blocker configured to block a second request for a cache line of said first cache of said first subsystem sent via said global interconnect and received after said first request.

25. The multiprocessing computer system of claim 24 wherein said blocker is further configured to block access to said directory configured to store the status of said cache line.

26. The multiprocessing computer system of claim 25 wherein said blocker includes a queue configured to store said second request for said cache line of said first subsystem sent via said global interconnect and received after said first request.

27. The multiprocessing computer system of claim 26 wherein said queue includes a read queue and a write queue.

28. The multiprocessing computer system as recited in claim 26 wherein said queue is further configured to store said third request for said cache line of said first subsystem sent via said global interconnect and received after said first request.

29. The multiprocessing computer system as recited in claim 28 wherein said store of said third request for said cache line of said first subsystem sent via said global interconnect continues until said first request has been serviced.

30. The multiprocessing computer system of claim 22 wherein said blocker is further configured to block a third request for said cache line sent via said global interconnect and received after said first request.

* * * * *

UNITED STATES PATENT AND TRADEMARK OFFICE
CERTIFICATE OF CORRECTION

PATENT NO. : 5,893,160

DATED : April 6, 1999

INVENTOR(S) : Paul N. Loewenstein and Erik Hagersten

It is certified that error appears in the above-identified patent and that said Letters Patent is hereby corrected as shown below:

"On the title page, after item [22] insert the following:
--[60] Related U.S. Application Data
    Continuation of application No. 08/630,703 filed Apr. 8, 1996.--.

Column 1, line 4, insert the following: This is a continuation of application Ser. No. 08/630,703 filed Apr. 8, 1996.--.

Signed and Sealed this

Twenty-eighth Day of November, 2000

Attest:

Q. TODD DICKINSON

*Attesting Officer*     *Director of Patents and Trademarks*